(12) United States Patent
Hirsch

(10) Patent No.: US 9,124,584 B2
(45) Date of Patent: Sep. 1, 2015

(54) LOCATION-SPECIFIC OR RANGE-BASED LICENSING SYSTEM

(75) Inventor: Karl Hirsch, Sammamish, WA (US)

(73) Assignee: Arvato Digital Services LLC, New York, NY (US)

(*) Notice: Subject to any disclaimer, the term of this patent is extended or adjusted under 35 U.S.C. 154(b) by 2991 days.

(21) Appl. No.: 11/409,267

(22) Filed: Apr. 24, 2006

(65) Prior Publication Data
US 2006/0277312 A1 Dec. 7, 2006

Related U.S. Application Data

(60) Provisional application No. 60/673,787, filed on Apr. 22, 2005.

(51) Int. Cl.
*H04L 29/06* (2006.01)
*G06F 21/00* (2013.01)
*H04B 7/185* (2006.01)

(52) U.S. Cl.
CPC ............ *H04L 63/10* (2013.01); *H04L 63/0492* (2013.01); *G06F 21/00* (2013.01); *H04B 7/185* (2013.01); *H04L 2463/101* (2013.01)

(58) Field of Classification Search
CPC .......... G06F 21/00; H04B 7/185; H04L 63/10
USPC .......................................... 709/229; 725/135
See application file for complete search history.

(56) References Cited

U.S. PATENT DOCUMENTS

| | | | |
|---|---|---|---|
| 5,386,369 A | 1/1995 | Christiano | |
| 5,671,412 A | 9/1997 | Christiano | |
| 6,125,446 A | 9/2000 | Olarig et al. | |
| 6,233,536 B1 | 5/2001 | Zale et al. | |
| 6,571,279 B1 | 5/2003 | Herz et al. | |
| 6,801,642 B2 * | 10/2004 | Gorday et al. | 382/118 |
| 6,859,791 B1 | 2/2005 | Spagna et al. | |
| 6,968,384 B1 | 11/2005 | Redding et al. | |
| 6,985,588 B1 * | 1/2006 | Glick et al. | 380/258 |
| 7,240,193 B2 * | 7/2007 | Hatfalvi et al. | 713/154 |
| 7,263,368 B2 * | 8/2007 | Knauerhase et al. | 455/456.1 |
| 7,702,592 B2 * | 4/2010 | Taylor | 705/71 |
| 7,848,703 B1 * | 12/2010 | Beard et al. | 455/41.2 |
| 2001/0048744 A1 * | 12/2001 | Kimura | 380/247 |
| 2002/0154157 A1 * | 10/2002 | Sherr et al. | 345/716 |
| 2002/0154777 A1 * | 10/2002 | Candelore | 380/258 |
| 2002/0169611 A1 * | 11/2002 | Guerra et al. | 704/270 |
| 2003/0003868 A1 * | 1/2003 | Juurikko | 455/41 |
| 2003/0043930 A1 * | 3/2003 | Morris | 375/285 |

(Continued)

OTHER PUBLICATIONS

Smith, "Digital Rights Management & Protecting the Digital Media Value Chain", 2004.*

(Continued)

*Primary Examiner* — O. C. Vostal
(74) *Attorney, Agent, or Firm* — Roylance, Abrams, Berdo & Goodman, LLP

(57) ABSTRACT

A system and method are provided for providing content to a user terminal based on the location of the user terminal within a specific range. If the user is proximate the boundary of the range, the user is prompted to make a decision concerning purchase or authorized use of the content. User options can be, before leaving the range, to purchase the content, to end the current session or leave the range with less than full functionality of the content, and to return to operating the user terminal within the range.

24 Claims, 4 Drawing Sheets

```
400
```

YOU ARE GETTING OUT OF RANGE. YOUR TRIAL VERSION OF THE PROGRAM WILL TERMINATE UNLESS YOU WISH TO PURCHASE A FULL VERSION. PLEASE SELECT ONE OF THE FOLLOWING:

1. I WISH TO PURCHASE THE PROGRAM
2. I DO NOT WANT TO PURCHASE THE PROGRAM AT THIS TIME PLEASE TERMINATE MY SESSION.
3. I AM STILL TRIALING THE PROGRAM AND WILL GO BACK WITHIN RANGE.

(56) References Cited

U.S. PATENT DOCUMENTS

| | | | |
|---|---|---|---|
| 2004/0117624 A1* | 6/2004 | Brandt et al. | 713/166 |
| 2004/0203748 A1* | 10/2004 | Kappes et al. | 455/432.1 |
| 2004/0255139 A1* | 12/2004 | Giobbi | 713/193 |
| 2004/0261096 A1* | 12/2004 | Matz | 725/28 |
| 2005/0010963 A1* | 1/2005 | Zeng et al. | 725/131 |
| 2005/0027846 A1* | 2/2005 | Wolfe et al. | 709/223 |
| 2005/0071278 A1* | 3/2005 | Simelius | 705/52 |
| 2005/0119977 A1* | 6/2005 | Raciborski | 705/59 |
| 2005/0124315 A1* | 6/2005 | Kageyama et al. | 455/403 |
| 2005/0137921 A1* | 6/2005 | Shahriari | 705/7 |
| 2005/0206519 A1* | 9/2005 | Tsui et al. | 340/539.13 |
| 2005/0245235 A1* | 11/2005 | Vesuna | 455/411 |
| 2005/0278716 A1* | 12/2005 | Koppen et al. | 717/168 |
| 2006/0058045 A1* | 3/2006 | Nilsen | 455/456.5 |
| 2006/0059099 A1 | 3/2006 | Ronning et al. | |
| 2006/0059100 A1 | 3/2006 | Ronning et al. | |
| 2006/0059561 A1 | 3/2006 | Ronning et al. | |
| 2006/0075455 A1* | 4/2006 | Koch et al. | 725/135 |
| 2006/0088039 A1* | 4/2006 | Kakivaya et al. | 370/400 |
| 2006/0145811 A1* | 7/2006 | Nantz et al. | 340/5.72 |
| 2006/0198333 A1* | 9/2006 | Sabo et al. | 370/328 |
| 2006/0217851 A1* | 9/2006 | McGuffin et al. | 701/4 |
| 2007/0183649 A1* | 8/2007 | Kiefer et al. | 382/154 |
| 2008/0262922 A1* | 10/2008 | Ahn et al. | 705/14 |

OTHER PUBLICATIONS

Messerges et al., "Digital Rights Management in a 3G Mobile Phone and Beyond", 2003.*

Liu et al., "Digital Rights Management for Content Distribution", 2003.*

Mulligan et al., "How DRM-Based Content Delivery Systems Disrupt Expectations of 'Personal Use'", 2003.*

* cited by examiner

LOCATION-SPECIFIC OR RANGE-BASED LICENSING SYSTEM

This application claims the benefit of U.S. provisional application Ser. No. 60/673,787, filed Apr. 22, 2005.

CROSS-REFERENCE TO RELATED APPLICATION

Related subject matter is disclosed and claimed in U.S. patent application Ser. No. 10/434,355, filed May 9, 2003, which is hereby incorporated by reference in its entirety.

FIELD OF THE INVENTION

The present invention relates to a system and method for providing geographic location or site-specific licensing of content and, more specifically, to a site-specific licensing application installed on a user's personal computer or available via a local web server that allows use of protected content within a predetermined distance range and restricts use outside of the range (e.g., converts the protected content to trial mode, requires purchase of a license, or terminates execution of the application).

BACKGROUND OF THE INVENTION

A number of content publishers offer a variety of content to users of computer and/or media playback devices. The content (e.g., software applications, video games, videos, graphic, text and/or audio content, and so on) is made available to users (e.g., via downloading) as freeware, shareware, trialware, protected content, and so on. Protected content can be, but is not limited to, content for which a user must be registered and/or authorized to use, and for which purchase of a license may be required before use.

A number of physical or geographic locations or sites are available which promote the use of computers and internet access. For example, a number of coffee houses, bars, restaurants, libraries, travel assistance locations (e.g., airport lounges), hotels and so on provide connectivity and internet access points to users for profit or for free as a convenience to customers.

It would be advantageous to configure physical or geographic locations with internet access points that offer a variety of protected content for use within a limited range. Such a configuration would benefit content providers and publishers, establishments promoting computer connectivity and internet access, and users alike.

SUMMARY OF THE INVENTION

In accordance with an aspect of the present invention, a system and method provide geographic location or site-specific licensing of content and, more specifically, a site-specific licensing application installed on a user's personal computer or available via a web server that allows use of protected content within a predetermined distance range and restricts use outside of the range (e.g., converts the protected content to trial mode, requires purchase of a license, or terminates execution of the application).

In accordance with an exemplary embodiment of the present invention, a range-based system for licensing protected content in a communication network is provided that comprises: an access point device for providing internet access to a location having a selected range in which authorized use of protected content is provided, and a site-specific licensing application having a server side and client side operable, respectively, on the internet access point device and at least one guest computing device. The guest computing device is programmed via the client side to obtain selected protected content for use within the range. The access point device is programmed via the server side to determine when the at least one guest computing device has left or is about to leave the range, and to generate a prompt to indicate when the guest computing device has left or is about to leave the range.

In accordance with an exemplary embodiment of the present invention, the location can be non-stationary.

In accordance with other aspects of the present invention, a license server is connected to the communication network and programmed to manage a distribution of authorizations to use protected content to at least one guest computing device operating within the range of authorized operation. The terms of a license can vary between a provider of the access point and a license server connected to the communication network and programmed to manage a distribution of authorizations to use protected content to at least one guest computing device operating within the range of authorized operation. A license can comprise a timing operation that restricts use of selected content at the location.

In accordance with yet another aspect of the present invention, a prompt is an indication prompting a user to select from a plurality of options comprising of acquiring a license for the protected content for authorized use outside the range, purchasing a license for the protected content for authorized use outside the range, registration for authorized use of the protected content outside the range, terminating a current session with a license server operating to make the protected content accessible within the range, leaving the range with less than full functionality of the protected content, and returning to operating the at least one guest computing device within the range.

In accordance with other aspects of the present invention, the access point device is programmed to determine range based on at least one of signal strength between the guest computing device and the access point device, and the geographic position of the guest computing device relative to the location. The guest computing device can be programmed to periodically validate use of the selected protected content by determining the signal strength of communication signals transmitted between the user computing device and the access point device. A client side site-specific licensing application and selected protected content can remain resident on the guest computing device and are used again when the guest computing device is within the range again.

BRIEF DESCRIPTION OF THE DRAWINGS

The above and other exemplary objects, features and advantages of certain exemplary embodiments of the present invention will be more apparent from the following description taken in conjunction with the accompanying drawings, in which.

DETAILED DESCRIPTION OF THE EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1B:
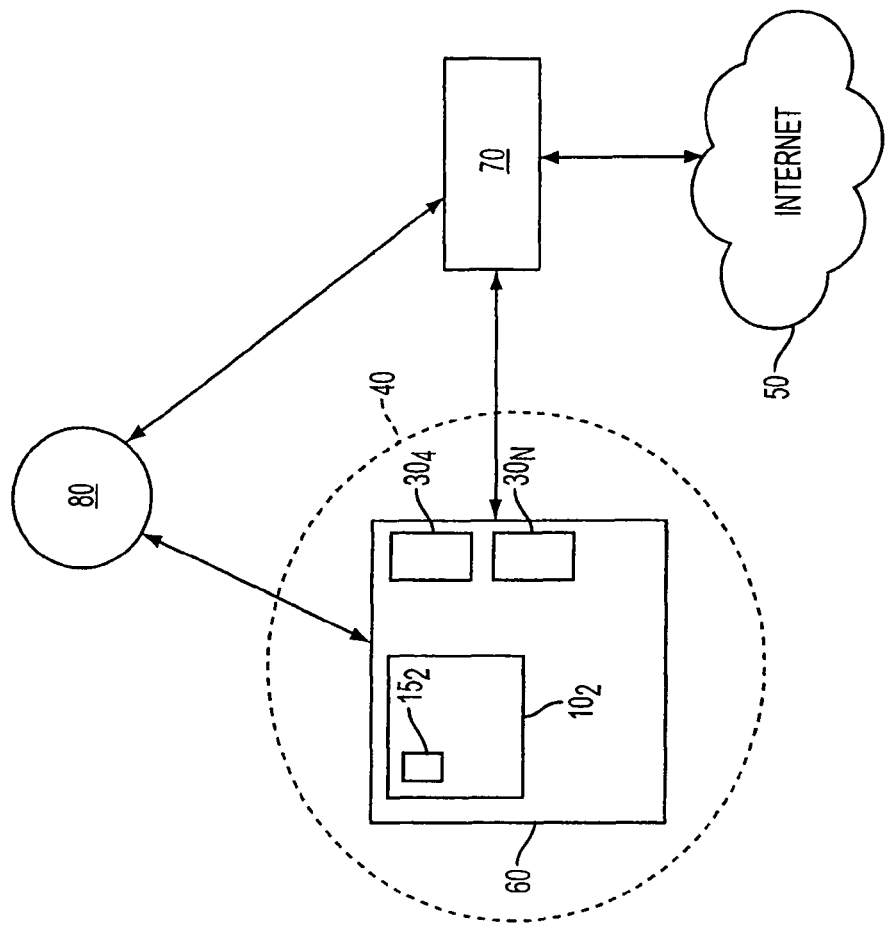
FIG. 1 depicts an exemplary internet access point having a predetermined range within which protected content can be used and outside of which a user must choose to either license the content or return within the range in accordance with an exemplary embodiment of the present invention.
Figure 1A:
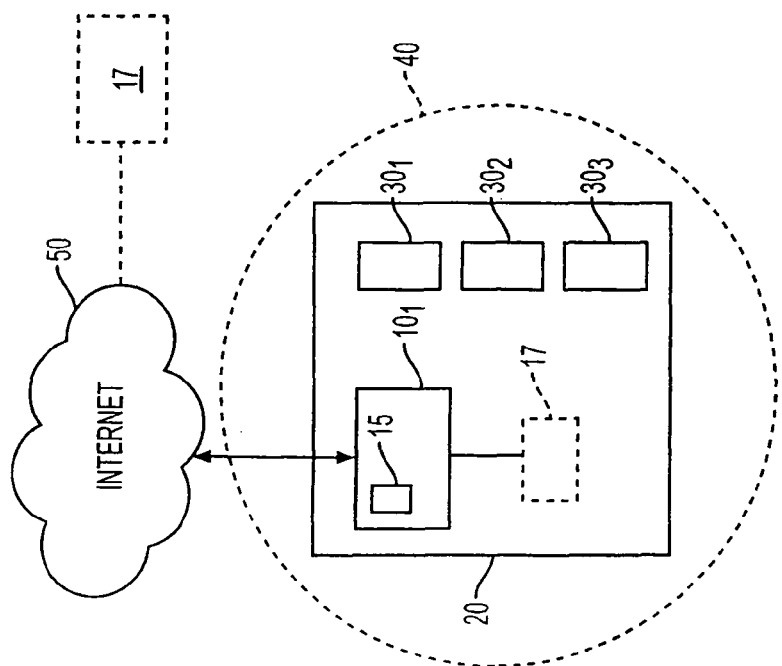

With reference to FIG. 1, an exemplary internet access point 10 is illustrated that implements a predetermined range 40 within which protected content can be used in accordance with an exemplary embodiment of the present invention. The internet access point 10 is connected to the internet 50 or a private network and can comprise a web server 17 and access point either integrated or separated therefrom, and a database 15 described below. The access point 10 can connect to the internet via a wireless connection (e.g., a satellite, cellular or other radio frequency network) or via a wired connection (e.g., cable, POTS, DSL, and so on) The internet access point 10 preferably comprises wireless or wired internet access to at least one user computing device hereinafter referred to as a "guest computer" 30. The guest computer 30 can be a personal computer, a laptop or other portable computing device (e.g., a personal data assistant, a cellular telephone with wireless internet access and the like). The internet access point 10 preferably provides a variety of content from which a user can select to download and use without charge within the predetermined range 40 of the stationary location 20. The stationary location 20 can comprise a coffee shop, hotel, motel, resort, office building, internet cafè, bookstore, conference center and the like. The content can comprise a trial version of a computer application software, as well as other protected content such as text, graphic, audio, digital or multimedia files. Within the confines of the range 40, a user is free to use the application or content. However, if the user nears the borders of the range 40, the user is prompted to overcome the content protection via one or more different types of digital rights management solutions such as requiring registration, authentication, entry of a receipt or transaction number, or purchase of a license to use the application. If the user chooses not to overcome the content protection, the application will become inactive outside the range 40, or at least only partially functional or functioning at a degraded level (e.g., at lesser speed or quality).

It should be appreciated by those skilled in the art that the internet access point 10 is not limited to a stationary location. For example, a non-stationary location 60 can comprise a train, plane, cruise ship, bus or the like. In this example, internet access point 10 can connect to the internet 50 via a satellite 80, which communicates with a base station 70 (e.g., a satellite and/or a cellular network), or the internet access point 10 can connect to the base station 70 directly. In the case of a cruise ship or where there are no terrestrial base stations, internet access point 10 can connect to the internet 50 via satellite. It should be noted that the range 40 travels with the non-stationary location 60. Specifically, when a user travels, the user is connected to the internet access point 10, which moves with the user and provides a local network address. Since the internet access point 10 is connected to the internet 50 via satellite 80, base station 70 or other radio frequency communication system component, the user is isolated from their actual movement. To the user, being in a stationary location or non-stationary location is transparent. The user's signal strength and the internet access point 10 identity will remain constant unless the user moves. However, when a user departs the location or nears the range 40, the user will be prompted as to whether the user wants to continue using the content off site by overcoming the content protection.

The access point identity is important since, at some later point in time, internet connectivity could be re-established at a different access point 10 and also the device may or may not be in use when leaving range of the access point. Accessing the content when in good range of a different (license invalid) access point preferably triggers the same operations described above that occur when leaving the original access point range.

The present invention will now be discussed in more detail. In accordance with an aspect of the present invention, a site-specific licensing application can be locally installed on the guest computer 30 or accessible via a local web server 17 associated with the location 20 or 60 or a remote web server 17. The access and/or installation of protected content can be managed based on rights or specific wireless networks used by the location. By way of an example, a wireless application server can be implemented via a wireless LAN or hot spot or other protocol (e.g., Blue Tooth) whereby a wireless communication network associated with the location can broadcast a secure system ID to the guest computer 30 to allow a connection thereto via a radio frequency channel within a selected spectrum. The guest computer 30 can then negotiate with the wireless communication network in a manner similar to a modem. The connection to the wireless communication network can be range-specific based on the signal strength of the signals communicated from the guest computer 30 to the wireless network via the internet access point 10. That is, when the signal strength of the signals from the guest computer 30 degrade below a predetermined level for the wireless communication network, the site-specific licensing application is programmed to terminate. The site-specific licensing application and/or the protected content can be served on demand at run-time. The guest computer 30 is programmed via the site-specific licensing application to negotiate with the internet access point 10 associated with the site to get the necessary applet or other content. The internet access point 10 then sends the desired protected content or application to the guest computer 30 as long as the guest computer 30 is within range 40 of the wireless communication network.

Specifically, whether or not the content is provided by a wide area local area network (WLAN) provider, using content that is marked as, for example, WLAN licensable preferably causes a "license request" to go the internet access point 10 serving as a license server authorized to grant licenses for that WLAN. It should be appreciated that the server 17 may be anywhere on the internet. If a license server is authorized to grant licenses for the given content and/or the internet access point 10, then an access point specific license can be generated and distributed to satisfy the license request. This could be accompanied by, for example, pre-authorized or immediate payment, be permanent or time-limited, or the license can be part of the service provided by the institution hosting the WLAN or their WLAN service provider. For illustrative purposes, a server is indicated at 17 in FIG. 1. It is to be understood that the wireless application server, a protected content server and the license server can be remote or local with respect to the access point 10 and can be configured as a unitary device, as separate and respective devices or in different combinations thereof.

In this manner, content acquisition and installation are separate from licensing. The user can select and install a game, for example, from some menu available through the WLAN provider, acquire (through various means as above) a license, and use the game in this example within the proximity of the internet access point 10. When the user visits another internet access point, they only have to negotiate a new license to use the game again. Once again, the terms or even availability of the license at the new internet access point are dependant on the relationship between the access point provider and the license server: the game might be free to use while visiting any location of a particular establishment, or through any access point served by a particular provider, or may cost extra or not be licensable for use through an unrelated access point, or the license may be granted to loyalty card holders, and the like.

The site-specific licensing application is programmed to generate one or more queries to the user when the application detects that the user is outside of the predetermined range 40 or periphery. For example, a query can be generated and displayed on a graphic user interface or audibly generated via a speaker associated with the guest computer 30 as to whether the user wishes to license the protected content or application(s), or return to within the range or periphery, or terminate access to the protected content and/or terminate the application in accordance with another aspect of the present invention. It should be appreciated by those skilled in the art that, although the range 40 is shown outside the location, the range 40 can also be within the location. Further the query can be generated by the application using an intercom or loudspeaker system or display system provided at the site 20, 60.

If the user elects to purchase a license for the protected content or application(s) to allow use thereof outside the predetermined range, the site-specific licensing application can provide one or more dialog boxes to guide the user to purchase the protected content from the vendor or third party fulfillment center.

In another embodiment of the present invention, the location or range specific feature can be combined with a timing feature. That is, the limitations of a user's use or protected content/application(s) can be confined by location, range and the amount of time the user has used a specific application or applications in general. This would prevent a user from continuously accessing a specific protected application every time the user is at that location and within the range of coverage. Thus, the user would have to accept a license to access that specific application again at that location or chain of locations. This would also allow merchants to have equal access to users without the concern that only popular applications would be accessed. Database 15 can store MAC or IP addresses of guest computers 30 and distribute the specific application they accessed to other locations of a chain, for example.

As an alternative to wireless network protocol technology to limit the range of an application, the site-specific licensing application can be programmed to track the location of the guest computer with respect to a predetermined range 40 or physical boundary corresponding to the location. By way of an example, the use of the site-specific licensing application and therefore the protected content/application(s) to which it restricts access can be limited to a selected signal strength of a pilot signal transmitted to and received by the guest computer 30, or to the confirmed connection of a peripheral device to an auxiliary port of the guest computer via programmed logic. The peripheral device can comprise any of a number of location determination devices such as a satellite-based position system like GPS, or triangulation system, or a proximity sensor. The client technology of the site-specific licensing application continues to check the location of protected application use and manage the access to the use of the protected application based on rules of use specific to geographic boundaries depicted by latitude and longitude or any other communicated units of geographic location via GPS or other position determination devices.

Figure 2:
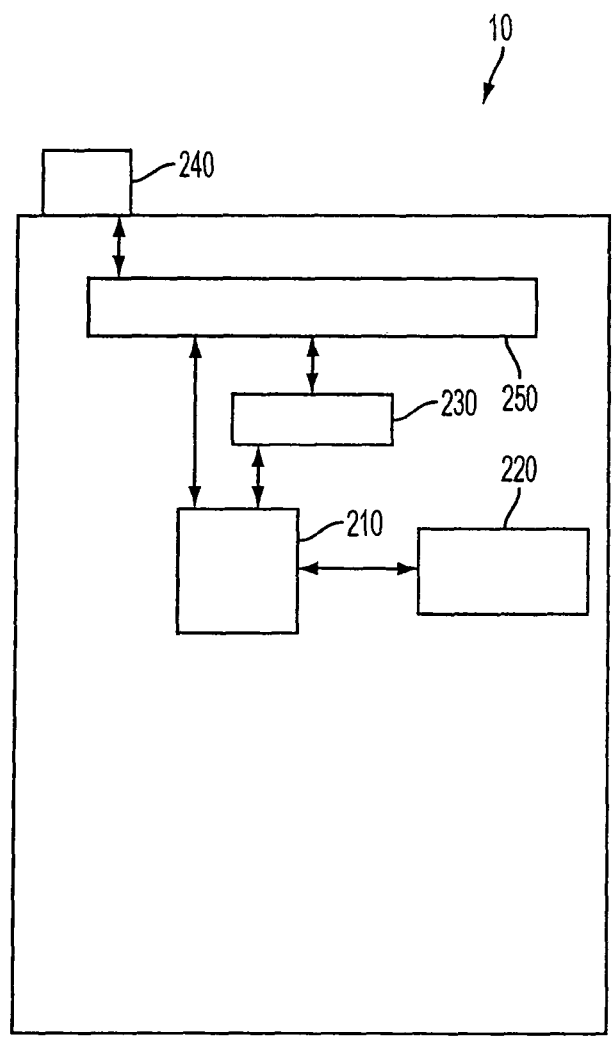
FIG. 2 is a block diagram of a system for implementing a location or site-specific content licensing system in accordance with an exemplary embodiment of the present invention.

FIG. 2 is a block diagram of a system for implementing a site-specific content licensing system in accordance with an exemplary embodiment of the present invention. Specifically, the internet access point of FIG. 2, comprises a controller 210, a memory 220, an input device 230, an antenna 240 and an interface device 250. The controller 210 serves to control the internet access point 10 to broadcast a secure system ID to the guest computer 30 via the antenna 240 in order to allow a connection thereto via a radio frequency channel within a selected spectrum (e.g., WiFi, WiMax, EV-DO, and so on). The guest computer 30 then negotiates with the wireless communication network. The internet access point 10 retrieves the desired content from the internet 50 via interface device 250, which can be an Ethernet connection or the like. The connection to the wireless communication network can be range-specific based on the signal strength of the signals communicated from the guest computer 30 to the wireless network via the internet access point 10. That is, when the signal strength of the signals from the guest computer 30 degrades or falls below a predetermined level for the wireless communication network, the site-specific licensing application is programmed to terminate. The site-specific licensing application and/or the protected content/application(s) can be served on demand at run-time. The internet access point 10 then sends the desired protected content or application to the guest computer 30 as long as the guest computer 30 is within range 40 of the wireless communication network.

The processor 210 generates one or more queries to the user when the application or the internet access point 10 detects that the user is outside of the predetermined range 40 or periphery.

The memory 220 can store MAC addresses or IP addresses of guest computers 30 and programs for querying the user on whether the protected content/application(s) should be purchased when it is detected that the user is near the range 40.

In accordance with an exemplary embodiment of the present invention, the guest computer's client application that is protecting the software or file (i.e., the client side of the site-specific licensing application) periodically (e.g., every minute, and at least upon launch) checks with the server (e.g., the wireless access point 10) to validate for continued use. When the range is too weak to reach the server or access point 10, no validation can occur. Thus, the client application restricts further use of the protected content. This licensing client (and the actual content) remains resident on the guest computing device and could be used again when the guest computing device is within range again.

Figure 3:
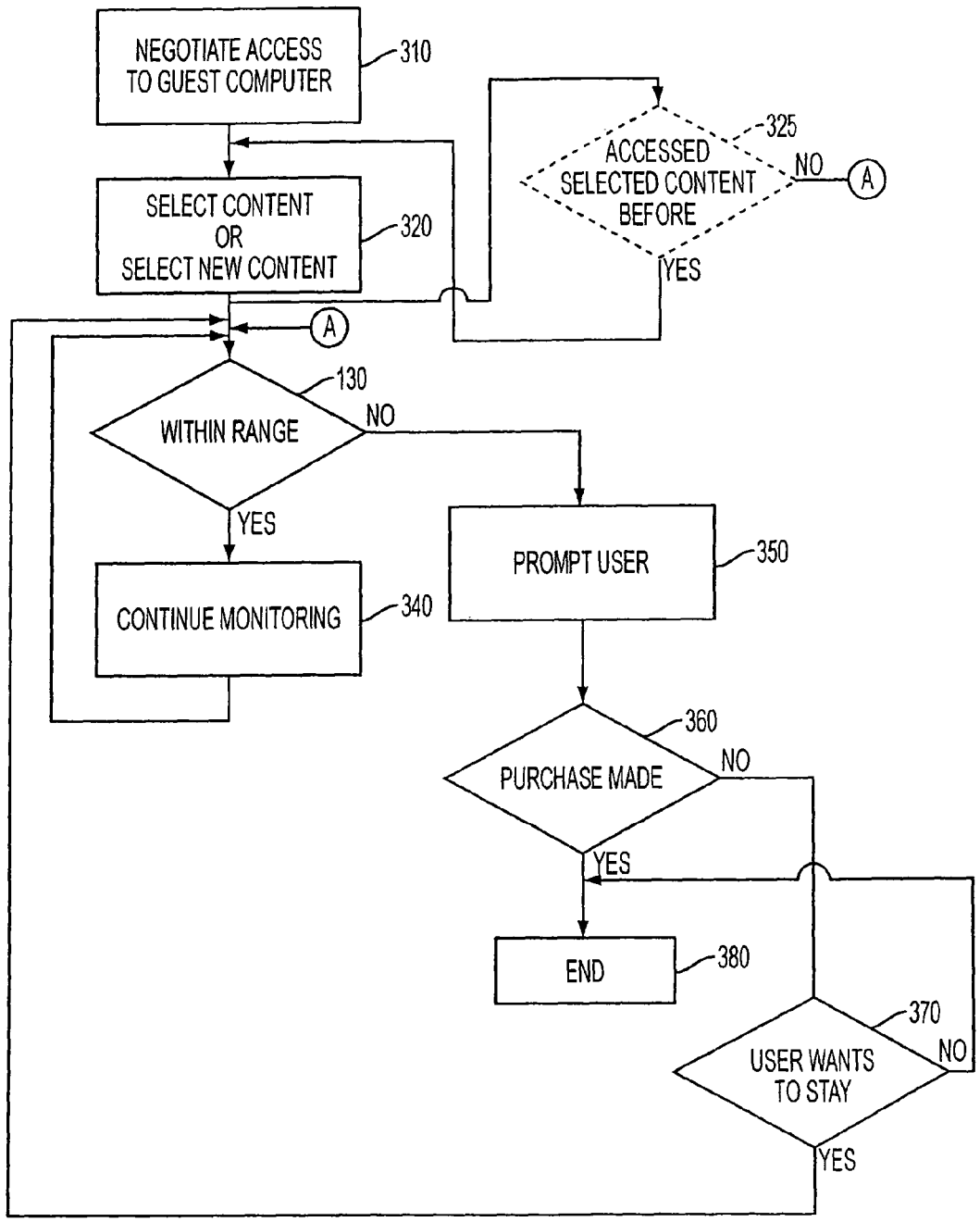
FIG. 3 is a flow chart depicting operations to implement a site-specific content licensing system in accordance with an exemplary embodiment of the present invention.

FIG. 3 is a flow chart depicting operations to implement a site-specific content licensing system in accordance with an exemplary embodiment of the present invention. The method begins at step 310 where the internet access point negotiates with the guest computer 30 concerning establishing a session. At step 320, the user selects the protected content/application(s) the user wants for trial purposes via the guest computer 30. Optionally, if the user has visited that location or that chain of locations before, the establishment may require that the user select a different content via the internet access point 10 at step 325.

At step 330, a determination is made as to whether the user is within range of the location. The determination can be made by the internet access point 10 or via the internet access point and software or hardware communicated or provided to the guest computer 30. If the user is within range the internet access point continues to monitor the range 40 of the guest computer 30 at step 340.

Figure 4:
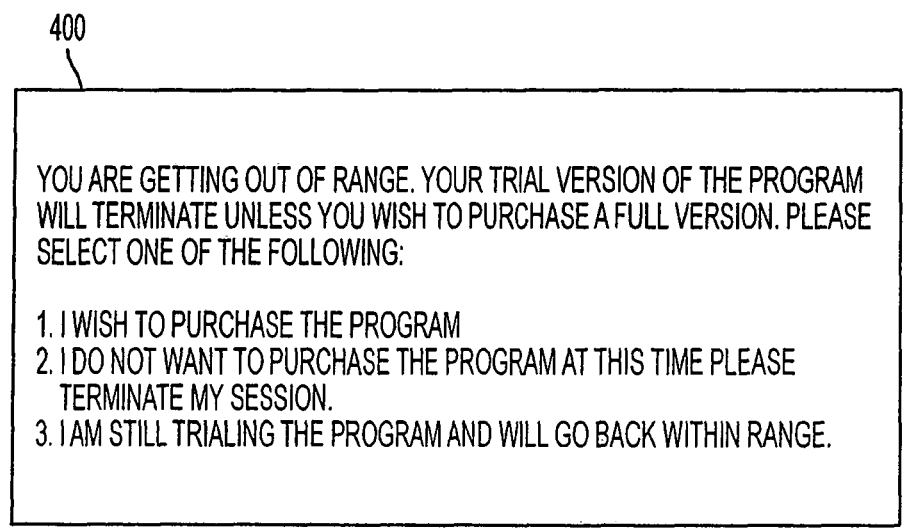
FIG. 4 is an exemplary screen generated on the graphical user interface of a guest computer by site-specific content licensing system in accordance with an exemplary embodiment of the present invention.

If the user is out of range 40, the user is prompted to make a decision concerning purchase of the protected content/applications at step 350. FIG. 4 discloses an example of what the guest computer 30 may display to the user. The display may require the user to either register, authenticate, purchase a license or go within range.

At step 360, if a purchase is made or authorized use is otherwise obtained, the method ends. If a purchase is not made or authorized use is not obtained, the user is asked whether the user wants to continue the trial at step 370. The user then gets back within range and the method returns to step 330. If the user does not want to stay, the content terminates and removes user access to the user or a degraded version of the content is provided. The program returns to step 380.

FIG. 4 is an exemplary screen generated on the graphical user interface of a guest computer by site-specific content licensing system in accordance with an exemplary embodiment of the present invention. Specifically, FIG. 4 illustrates user prompts on the display of the guest computer 30. In this case, the user is told that the user is out of range and must either purchase a license or the content will be terminated if the user does not get back within range 40.

While the invention has been shown and described with reference to a certain embodiment thereof, it will be understood by those skilled in the art that various changes in form and details may be made therein without departing from the spirit and scope of the invention. Consequently, the scope of the invention should not be limited to the embodiment, but should be defined by the appended claims and equivalents thereof.

What is claimed is:

1. A range-based system for licensing protected content in a communication network, comprising:
   an access point device at a physical location for providing content that at least one guest computing device can select, download and use within a selected geographical range of the access point device; and
   a site-specific licensing application having a server side application and client side application operable, respectively, on the access point device and the at least one guest computing device;
   wherein the guest computing device is programmed via the client side application to download and obtain automated authorization for use of selected protected content while the guest computing device is located within the range; and
   wherein the access point device is programmed via the server side application to determine when the at least one guest computing device has left or is about to leave the range, provide authorization of use of selected protected content downloaded by the guest computing device and restrict the authorized use to only while the guest computing device is located within the range, and to generate a prompt to indicate when the guest computing device has left or is about to leave the range.

2. A range-based system for licensing protected content as claimed in claim 1, further comprising a license server connected to the communication network and programmed to manage a distribution of authorizations to use protected content to at least one guest computing device operating within the range of authorized operation.

3. A range-based system for licensing protected content as claimed in claim 2, wherein the authorizations can comprise an automated license, and terms of the license can vary between a provider of the access point device and the license server.

4. A range-based system for licensing protected content as claimed in claim 3, wherein the license comprises a timing operation that restricts use of selected content at the location.

5. A range-based system for licensing protected content as claimed in claim 1, wherein the protected content comprises one or more pieces of content selected from the group consisting of a software application, text, graphics, audio, video, a software executable file, a multimedia file, a digital file, and a video game.

6. A range-based system for licensing protected content as claimed in claim 1, wherein the prompt is an indication prompting a user to select from a plurality of options comprising acquiring a license for the protected content for authorized use outside the range, purchasing a license for the protected content for authorized use outside the range, registration for authorized use of the protected content outside the range, terminating a current session with a license server operating to make the protected content accessible within the range, leaving the range with less than full functionality of the protected content, and returning to operating the at least one guest computing device within the range.

7. A range-based system for licensing protected content as claimed in claim 1, wherein the access point device is programmed to determine range based on at least one of signal strength between the guest computing device and the access point device, and a geographic position of the guest computing device relative to the location, the use of the selected protected content by the guest computing device being restricted when it is determined to not be in the range.

8. A range-based system for licensing protected content as claimed in claim 1, wherein a guest computing device is selected from a group consisting of a personal computer, a laptop, a portable computing device, a personal data assistant, and a cellular telephone.

9. A range-based system for licensing protected content as claimed in claim 1, wherein the location is non-stationary.

10. A method of providing range-based licensing of protected content comprising steps for:
    providing a plurality of protected content from which users can obtain selected content via downloading or accessing from a server for automated authorized use without charge within a predetermined range of a geographic location of an access point;
    determining when user computing devices are proximal to a boundary of the predetermined range;
    generating an indication that prompts a user to perform an operation when the corresponding one of the user computing devices is determined to be proximal to the boundary, the operation being selected by the user from a plurality of operations selected from a group consisting of purchasing a license for the selected content for continued use outside range, not purchasing the license and leave the range without further use of the selected content, returning to the range and continue use of the selected content, and leaving the range with a degraded version of the selected content, wherein authorized use comprises providing authorization of use of selected protected content downloaded by the user computing device and restricting the authorized use to only while the user computing device is located within the range.

11. A method of providing range-based licensing of protected content as claimed in claim 10, wherein the providing step comprises steps for:
provising the user computing device with an access point identity when the user computing device establishes a session with the access point device provided at the geographic location to use the selected content;
terminating the session;
re-establishing the session with a different access point device; and
performing the generating step when the access point identity is not recognized by the different access point device.

12. A method of providing range-based licensing of protected content as claimed in claim 10, wherein the determining step comprises using a position determination device with the user computing device to determine a geographic location of the user computing device.

13. A method of providing range-based licensing of protected content as claimed in claim 10, wherein the location has the access point device and a site-specific licensing application having a server side application and client side application operable, respectively, on the access point device and at least one user computing device, the determining step comprising steps for:
determining if signal strength of the at least one user computing device for communicating with the access point device is less than a selected threshold.

14. A method of providing range-based licensing of protected content as claimed in claim 13, wherein the user computing device is programmed via the client side application to restrict further use of the selected protected content if a communication signal transmitted between the user computing device and the access point device has a signal strength that is below a selected threshold.

15. A method of providing range-based licensing of protected content as claimed in claim 13, wherein the user computing device is programmed via the client side application to periodically validate use of the selected protected content by determining the signal strength of communication signals transmitted between the user computing device and the access point device at selected time intervals, and restrict further use of the selected protected content when the signal strength is below a selected threshold.

16. A method of providing range-based licensing of protected content as claimed in claim 13, wherein client side application and selected protected content remain resident on the user computing device and are used again when the user computing device is within the range again, the use of the selected protected content by the user computing device being restricted upon determining that the computing device is not in the predetermined range.

17. A method of providing range-based licensing of protected content as claimed in claim 13, wherein the user computing device is programmed via the client side application to determine the signal strength of communication signals transmitted between the user computing device and the access point device upon launching of the client side application to determine the predetermined range, the use of the selected protected content by the user computing device being restricted upon determining that the computing device is not in the predetermined range.

18. A method of providing range-based licensing of protected content comprising steps for:
establishing a communication session between a guest computing device and an access point provided at a physical location characterized by a selected geographical range;
obtaining selected protected content via the guest computing device for authorized use of the selected protected content downloaded by the guest computing device within the selected range of the access point;
determining if the guest computing device is located within the selected geographical range of the access point;
generating a prompt when the guest computing device is located near or beyond the range of the access point, the prompt asking a user of the guest computing device to obtain authorized use of the protected content outside the range of the access point,
wherein authorized use comprises providing authorization of use to the guest computing device of the protected content downloaded and restricting the authorized use to only while the guest computing device is located within the range.

19. A method of providing range-based licensing of protected content as claimed in claim 18, further comprising a step for permitting continued use of the protected content if the guest computing device is in the range.

20. A method of providing range-based licensing of protected content as claimed in claim 18, further comprising a step for terminating use of the protected content if the guest computing device is not in the range and authorized use is not obtained.

21. A method of providing range-based licensing of protected content as claimed in claim 18, further comprising a step for providing limited use of the protected content if the guest computing device is not in the range and authorized use is not obtained, the limited use being at least one of operating the protected content at less than full functionality, and operating the protected content at a degraded quality.

22. A method of providing range-based licensing of protected content as claimed in claim 18, wherein the protected content comprises one or more pieces of content selected from a group consisting of a software application, text, graphics, audio, video, a software executable file, a multimedia file, a digital file, and a video game.

23. A method of providing range-based licensing of protected content as claimed in claim 18, wherein a guest computing device is selected from a group consisting of a personal computer, a laptop, a portable computing device, a personal data assistant, and a cellular telephone.

24. A method of providing range-based licensing of protected content as claimed in claim 18, wherein the location is non-stationary.

* * * * *